United States Patent Office 3,310,350
Patented Mar. 21, 1967

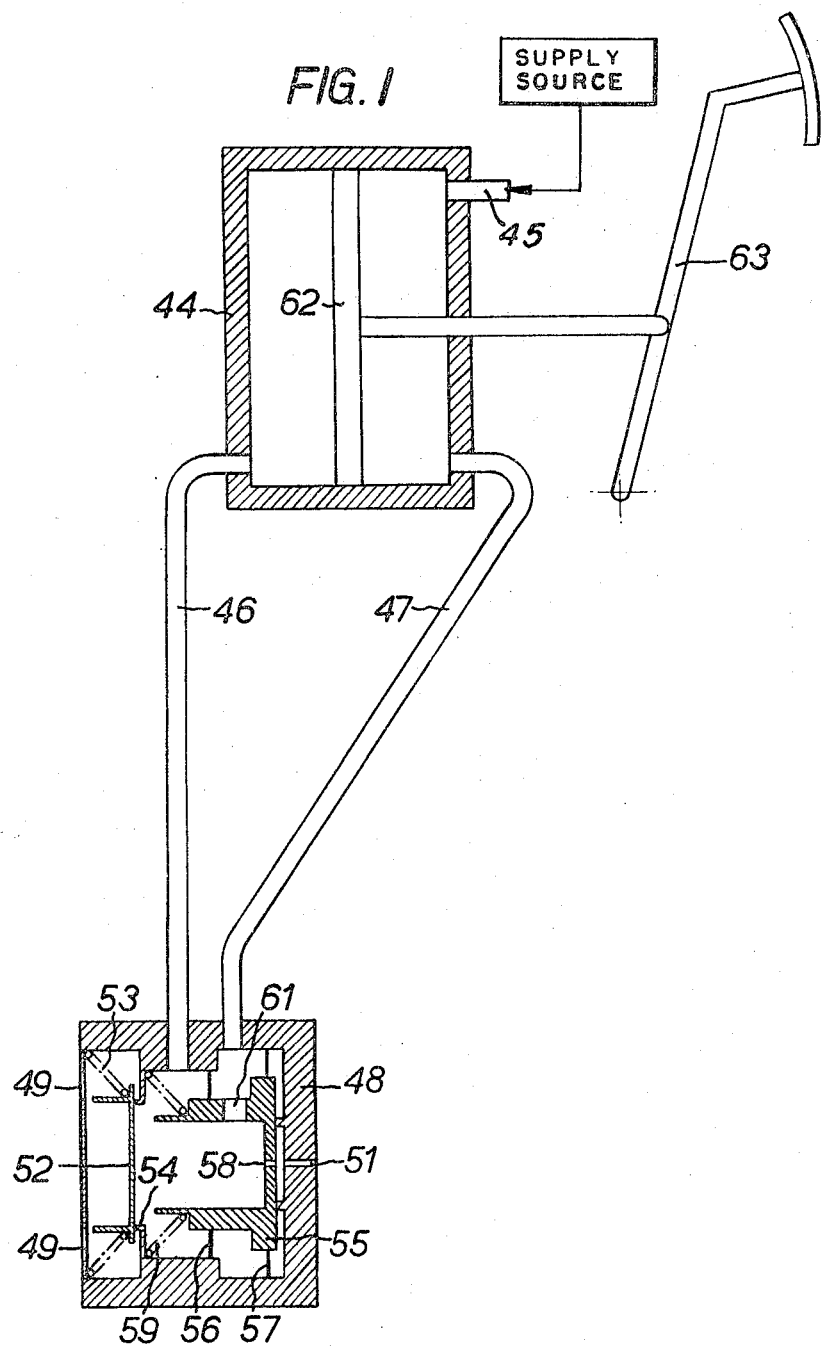

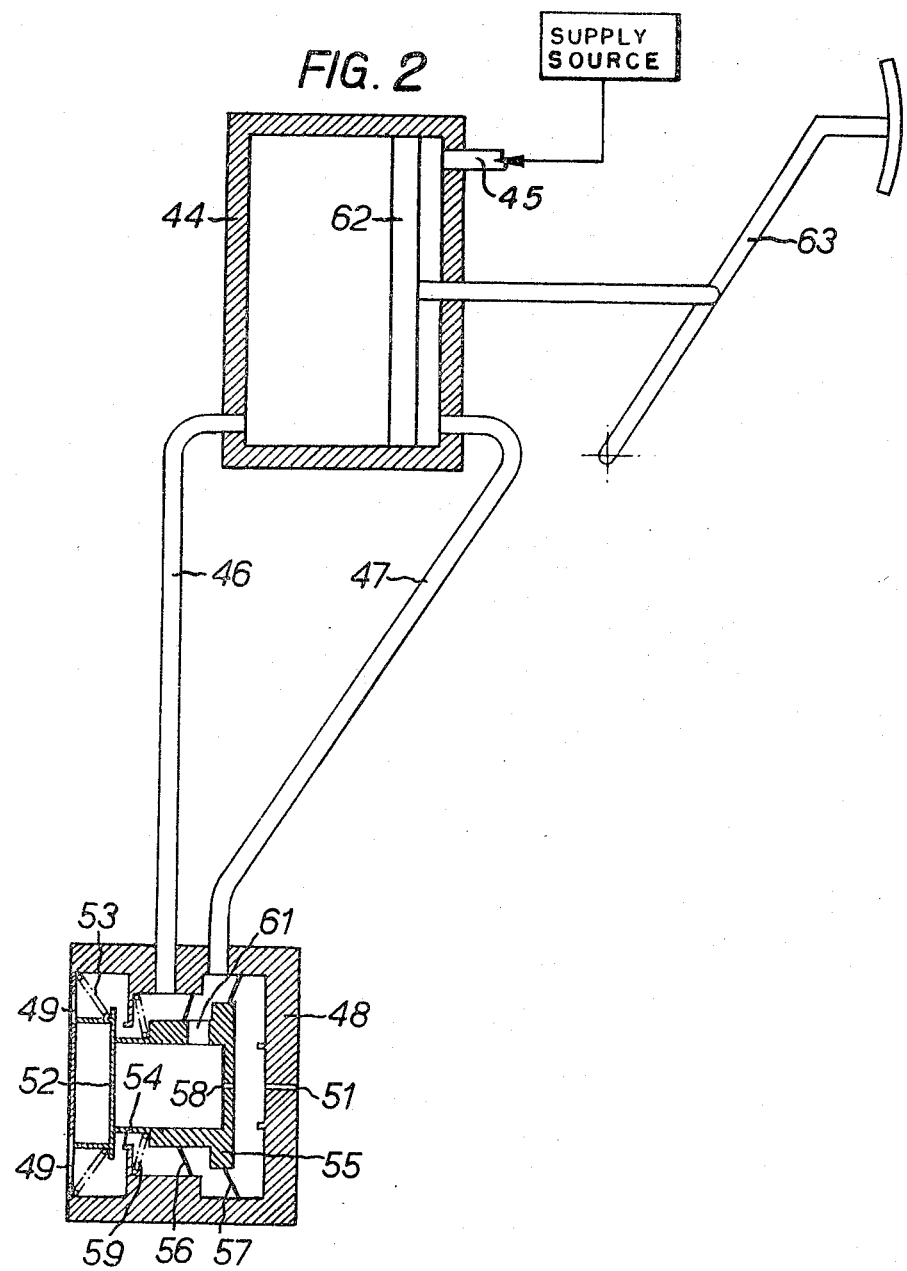

3,310,350
ANTI-SKID DEVICE FOR VEHICLES
Alexander John Wilson, Sutton Coldfield, England, assignor to Girling Limited, Birmingham, England, a British company
Original application Sept. 20, 1963, Ser. No. 310,213. Divided and this application Jan. 11, 1966, Ser. No. 529,599
Claims priority, application Great Britain, Sept. 27, 1962, 36,672/62
5 Claims. (Cl. 303—60)

This application is a division of Ser. No. 310,213 filed September 20, 1963.

This invention relates to a new or improved valve for controlling relative fluid pressure in two spaces or chambers.

According to our invention in a relay valve for controlling relative fluid pressures in first and second spaces or chambers comprising a first valve movable in a housing and connected to first and second movable control members, the first space or chamber opens into the housing between the control members and the second space or chamber opens into the housing between the second control member and a seating in the housing with which co-operates a second valve member biassed towards the seating and engageable by the first valve member to cut off communication between the spaces or chambers when the first valve member is moved in response to an actuating fluid pressure, the second valve member then being moved away from the seating to connect the second space or chamber to a fluid pressure different to the pressure in the first space or chamber, the first valve member normally being biassed away from the second valve member.

The movable control members comprise diaphragms.

One form of valve in accordance with our invention is illustrated in the accompanying drawings in which:—

FIGURE 1 is a diagrammatic view of a relay valve suitable for use with a vehicle skid device and incorporating a valve in accordance with our invention which is shown in the inoperative position; and FIGURE 2 is a diagrammatic view similar to FIGURE 1 but showing the valve in its operative position.

The drawings show a fluid pressure cylinder 44 and a control valve. One end of the cyinder is connected by a pipe 45 to a source of vacuum and opposite ends of the cylinder are connected by pipes 46 and 47 to the valve housing 48. One end of the housing 48 is open to atmosphere through ports 49 and the other end has a passage 51 for the admission of air from the control device. A plate valve 52 urged by a spring 53 against an annular seating 54 in the housing normally closes communication between atmosphere and the pipe 46. A floating cup-shaped valve member 55 is supported within the housing 48 by spaced diaphragms 56 and 57. The pipe 47 is connected to the space between the diaphragms and an orifice 58 in the valve member connects that space with the space between the diaphragms 57 and the end wall of the housing in which the passage 51 is located. A spring 59 normally holds the valve member in the position shown in FIGURE 1 in which it is spaced from the plate valve 52 and the pipes 46 and 47 are in communication through ports 61 in the valve member so that both ends of the relay cylinder are under vacuum. When air is admitted to the housing through the passage 51, the valve member 55 moves to the left and first engages the plate valve 52 to cut off communication between the pipe 46 and vacuum, and then moves the plate valve away from its seating to connect the pipe 46 to atmosphere. Air at atmospheric pressure then enters the left hand end of the relay cylinder 44 and moves the piston 62 to the right.

When this relay is used in conjunction with a device as shown in Serial No. 310,213, filed September 20, 1963, the reduction in the air flow to the relay valve when the member 34 engages the end of the housing may be such that the plate valve 52 is allowed to return into engagement with its seating to cut off the power from the relay cylinder but the valve member 55 remains in engagement with the plate valve so that the piston 62 of the relay cylinder does not return until the flow of air to the relay valve is completely cut off.

The piston 62 may act directly on a brake pedal 63 to move it towards the off position, as shown in the drawings, or it may act on the piston of a master cylinder, or it may simply increase the volume of a portion of an hydraulic transmission line between a master cylinder and the wheel cylinders of a braked wheel.

In an alternative arrangement the relay valve may be connected to a vacuum booster or servo unit actuating an hydraulic master cylinder, the relay valve controlling the pressure differential in the booster.

I claim:

1. A valve for controlling relative fluid pressures in first and second spaces, comprising a housing, first and second spaced control members in the housing, a first valve member connected to said first and second control members, a seating in the housing on the side of said second control member remote from said first control member, means providing communication respectively between said first space and said housing between said control members, and between said second space and said housing between said second control member and said seating, a second valve member engageable by said first valve member to cut off communication between the spaces when the first valve member is moved in response to an actuating fluid pressure, the second valve member then being moved away from the seating to connect the second pressure space to a fluid pressure different from the pressure in the first space, means biassing said second valve member towards said seating, and means normally biassing said first valve member away from said second valve member.

2. A valve as claimed in claim 1, wherein said first valve member comprises a hollow body open at an end adjacent to the second valve member, and having a port connecting the interior of the hollow body to a space in the housing between the control members, and a control orifice in an opposite end of the body providing communication between the interior of the body and a face of the first control member remote from the second valve member, which face is subjected to the actuating fluid pressure.

3. A valve as claimed in claim 1 wherein the movable control members comprise diaphragms.

4. A valve as claimed in claim 1 wherein at least one of said biassing means comprises a spring.

5. A valve as claimed in claim 1 wherein each biassing means comprises a spring.

No references cited.

EUGENE G. BOTZ, *Primary Examiner.*